United States Patent [19]
Hallett

[11] 3,770,303
[45] Nov. 6, 1973

[54] FLEXIBLE JOINT FOR FLUID CONDUIT SYSTEMS
[75] Inventor: Tom E. Hallett, Newport Beach, Calif.
[73] Assignee: Flexible Metal Hose Manufacturing Company, Costa Mesa, Calif.
[22] Filed: May 10, 1971
[21] Appl. No.: 141,515

[52] U.S. Cl. .................. 285/45, 285/94, 285/226, 285/351
[51] Int. Cl. ............................................ F16l 27/02
[58] Field of Search .................. 285/226, 227, 228, 285/229, 299, 300, 301, 9, 100, 101, 102, 94, 13, 14, 45, 351

[56] References Cited
UNITED STATES PATENTS
| | | | |
|---|---|---|---|
| 3,574,361 | 4/1971 | Contreras et al. | 285/226 |
| 570,405 | 10/1896 | Jerguson et al. | 285/226 X |
| 1,821,274 | 9/1931 | Plummer | 285/226 X |
| 2,840,394 | 6/1958 | Rohr | 285/226 X |
| 2,451,252 | 10/1948 | Stoeckly | 285/100 |
| 2,998,270 | 8/1961 | Watkins | 285/227 X |
| 2,613,087 | 10/1952 | Alford | 285/226 X |

FOREIGN PATENTS OR APPLICATIONS
| | | | |
|---|---|---|---|
| 238,971 | 7/1969 | U.S.S.R. | 285/301 |
| 1,126,871 | 9/1968 | Great Britain | 285/226 |
| 792,476 | 3/1958 | Great Britain | 285/226 |

Primary Examiner—Thomas F. Callaghan
Attorney—Reuben Wolk

[57] ABSTRACT

A flexible joint for tension fluid conduit systems providing angular flexibility while retaining full tension loads is provided. The joint has a zero leakage primary seal and a secondary seal which is arranged upstream of the primary seal. The secondary seal has load-bearing sealing faces which are isolated from external contaminants, are self lubricated to reduce bending moments during flexing movements, and the sealing faces of the secondary seal prevent the joint from being forced apart even with increased system pressures.

8 Claims, 3 Drawing Figures

PATENTED NOV 6 1973  3,770,303

INVENTOR
TOM E. HALLETT

BY
Reuben Wolk
ATTORNEY

FLEXIBLE JOINT FOR FLUID CONDUIT SYSTEMS

BACKGROUND OF THE INVENTION

Modern aircraft, missiles, and space vehicles often utilize fluid tension systems and associated components which conduct various fluids at extremely high pressures and at temperatures ranging from cryogenic lows to extreme highs established by the limits of the physical properties of the metals utilized whereby the stress loads on these systems and components from thermal expansion and contraction are appreciable. These stress loads if uncontrolled and allowed to transfer to the vehicle frame or associated system components can produce damage or malfunctions.

To prevent or reduce the build up of stresses resulting from deflections of the vehicle frame and from thermal expansions and contractions, for example, flexible devices or joints are often employed in a conduit system. Further, these flexible joints should be constructed to ensure minimum resistance to fluid flow therethrough.

In addition, it is important that flexible joints used in vehicles of the character mentioned above operate with optimum reliability. To achieve this reliability, it is desirable that these joints be provided with zero leakage primary seals, secondary seals, means for reducing wear and flow induced vibration stresses on key components, and fail-safe provisions.

SUMMARY

This invention provides a reliable flexible universal angulating joint particularly adapted for use in a tension fluid conduit system which has functional, safety, and extended life advantages not available in any other similar device. In particular, the joint has a secondary seal which is arranged upstream of the primary seal. The secondary seal has load-bearing sealing faces which are isolated from external contaminants, are self lubricated to reduce bending moments during flexing movements, and the sealing faces of the secondary seal prevent the joint from being forced apart even with increased system pressures.

Other details, uses, and advantages of this invention will be readily apparent from the exemplary embodiments thereof presented in the following specification, claims, and drawing.

BRIEF DESCRIPTION OF THE DRAWING

The accompanying drawing shows present preferred embodiments of this invention, in which.

DESCRIPTION OF ILLUSTRATED EMBODIMENTS

Figure 1:
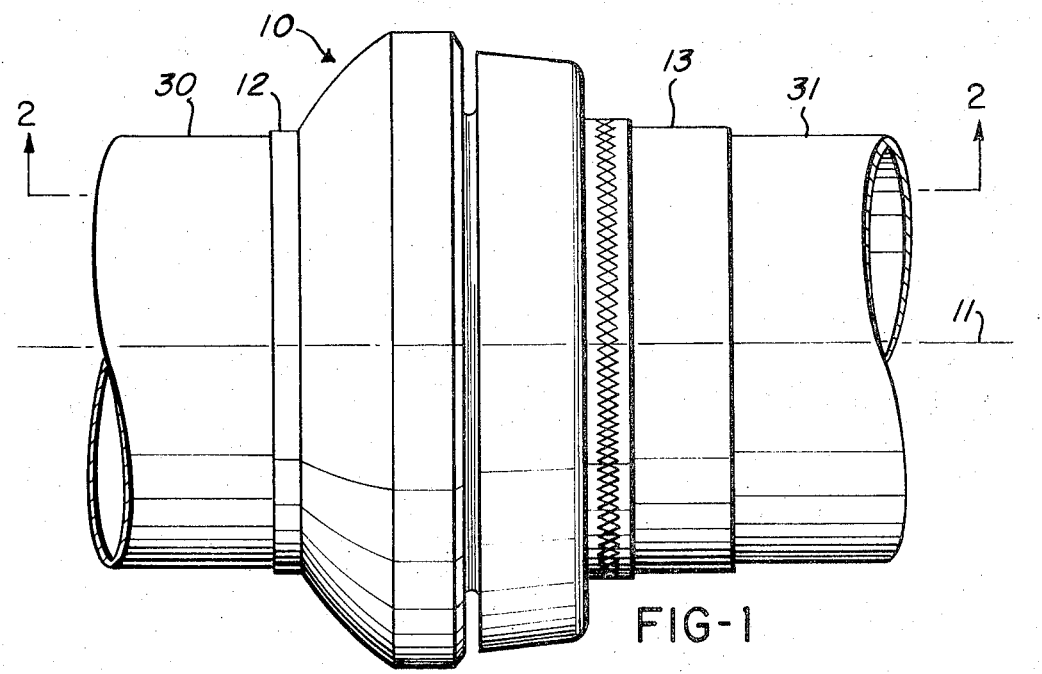
FIG. 1 is a side elevational view of one exemplary embodiment of the flexible joint of this invention fixed in position between a pair of associated conduits.
Figure 2:
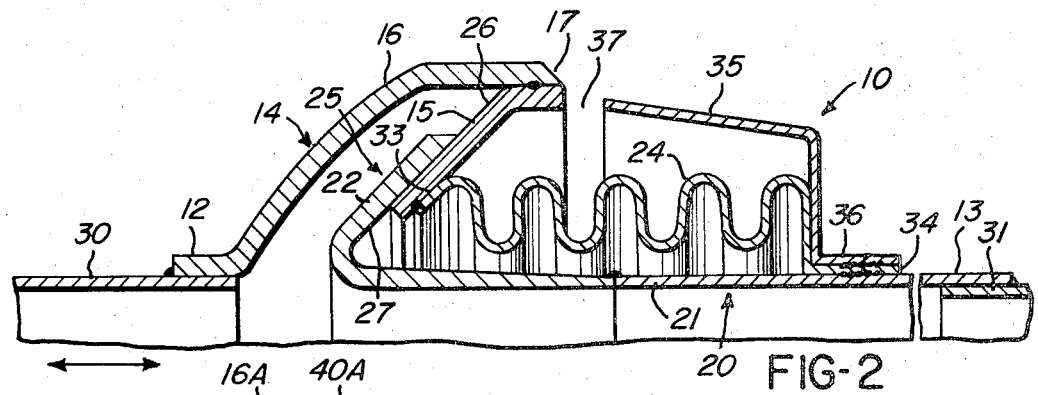
FIG. 2 is a sectional view taken essentially on the line 2—2 of FIG. 1.

Reference is now made to FIGS. 1 and 2 of the drawing which illustrate one exemplary embodiment of a flexible joint of this invention which is designated generally by the reference numeral 10 and such joint has a central longitudinal axis 11 and opposed ends 12 and 13.

The joint 10 has a first member or outer pressure retaining housing 14 which has an annular portion 15 which extends at an angle with respect to the axis 11 toward end 12 of the joint 10. The member 14 has a small diameter portion which defines end 12 and an adjoining gradually flaring main body 16 with the portion 15 extending from a large diameter edge 17 of the main body 16 and roughly parallel to a portion of such main body.

The joint 10 also comprises a tubular member or inner sleeve 20 which has a small diameter tubular portion 21 which corresponds in diameter to the small diameter portion 12 of the member 14. The member 20 has an outer end which defines the end 13 of the joint 10 and an inner end which terminates in an annular portion 22. The annular portion 22 extends concentrically outwardly of the member 20 away from the axis 11 and toward its end 13 and hence the end 13 of the joint 10.

The joint 10 has a primary seal in the form of a bellows 24 which provides a zero leakage connection between the members 14 and 20; yet, the bellows 24 allows members 14 and 20 to move relative to each other axially as shown by the double arrows in FIG. 2 or in a flexing or bending manner relative to each other.

The annular portions 15 and 22 of the members 14 and 20 respectively define what will be referred to as a redundant or secondary seal, designated generally by the reference numeral 25, for the joint 10 and such portions are arranged so that increased fluid pressure in the joint 10 tends to separate the members 14 and 20 and urge the annular portions 15 and 22 into tighter sealing engagement. It will also be appreciated that the arrangement of the annular portions 15 and 22 is such that they are fastened together in a hooked manner and with this hooking arrangement it is virtually impossible to disengage the members 14 and 20 even with failure of the primary seal or bellows 24.

As will be apparent from the drawing, the members 15 and 22 define the secondary seal 25 and such seal is arranged upstream of the primary seal or bellows 24. The secondary seal 25 extends the service life of the primary seal by reducing the stresses resulting from sudden applications of pressure loads. Further, in the event of failure of the primary seal or bellows 24 the conduit system would probably lose little if any fluid due to the sealing action of the secondary seal.

The annular portions 15 and 22 have cooperating load-bearing and sealing surfaces 26 and 27 which during normal operation may allow some fluid seepage therebetween. The surfaces 26 and 27 may be cooperating substantially frustoconical surfaces or cooperating annular segments of spherical surfaces depending on the intended application of the joint 10.

As indicated above, the surfaces 26 and 27 allow fluid being conveyed through the joint 10 to seep or flow in slight amounts therebetween and such fluid serves to lubricate the surfaces 26 and 27 and thereby reduce bending loads on the structural components of joint 10 during flexing or bending movements of its members 14 and 20 once these members have their ends 12 and 13 fixed in a conduit system to conduits 30 and 31 respectively.

The bellows 24 has resilient properties and normally yieldingly urges the annular portions 15 and 22 and in particular their cooperating sealing surfaces 26 and 27 respectively into sealing engagement. However, as further tension or pressure is set up in the ducts 30 and 31 and hence the joint 10 the members 14 and 20 tend to pull axially apart as shown by the double arrows in FIG. 2 thereby urging the members 15 and 22 into tighter sealing engagement.

The metal bellows 24 may be of a conventional substantially tubular construction and made of metal having high strength and formed into corrugations to create the necessary flexibility. The bellows 24 has opposed end portions 33 and 34 with the end portion 33 being fixed in a sealed manner, as by welding, to the annular portion 15 and its opposite end portion 34 being fixed to the member 20 also by welding. With this arrangement it will be seen that the primary seal or bellows 24 is arranged concentrically around the tubular portion 21 of the member 20.

The joint 10 may be provided with an optional protective cover or tubular shroud 35 which has one end 36 fixed to member 20 and extends concentrically around the bellows 24 toward the large diameter edge 17 of the main body 16 of member 14 leaving an annular gap 37 therebetween. The gap 37 allows flexing movements of opposed ends of the joint 10 and may also be used to accommodate a resilient device or member capable of providing a redundant or backup seal for the primary and secondary seals. The gap 37 also permits visual inspection of the primary seal for any leakage.

The joint 10 allows fluid flow therethrough with minimum turbulence because the tubular portion 21 of the member 20 covers the interior corrugated surface of the bellows 24. In addition, the arrangement and isolation of the bellows or primary seal 24 from the flow stream protects it from the stresses of flow induced vibration.

The member 20 of joint 10 carries tension loads from the conduit 31 through its annular portion 22 to member 14. In addition, the tubular portion 21 may serve as a base for stabilizing guides for the corrugations of the bellows 24 when such guides are employed.

Figure 3:
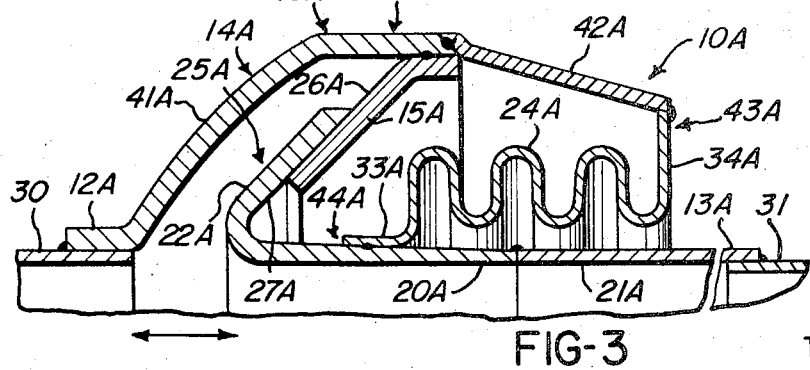
FIG. 3 is a view similar to FIG. 2 illustrating another examplary embodiment of this invention.

Another exemplary embodiment of a flexible joint of this invention is illustrated in FIG. 3 of the drawing. The joint of FIG. 3 is very similar to the joint 10; therefore, such joint will be designated generally by the reference numeral 10A and parts of the joint 10A which are similar to corresponding parts of the joint 10 will be designated by the same reference numeral as in the joint 10 followed by the letter designation "A" and not described again. Only those parts which are substantially different from corresponding parts of the joint 10 will be designated by a new reference numeral also followed by the letter designation "A" and described in detail.

The joint 10A employs a metal bellows 24A which is arranged so that it provides a sealing action with fluid pressure acting against the exterior of its tubular surface instead of the interior thereof as in the case of bellows 24 of the joint 10.

In the joint 10A the member 14A has a small diameter portion 12A defining the end 12A of such joint and the main body 16A has a right circular cylindrical portion 40A adjoined by a pair of substantially frustoconical portions 41A and 42A at opposite ends thereof. The annular portion 15A of member 14A extends from the central portion of the main body 16A and in particular extends from the right circular cylindrical portion 40A.

The primary seal or bellows 14A has opposed end portions 33A and 34A with end portion 34A being fixed to the terminal edge of the main body 16A and in particular to the terminal edge of its frustoconical portion 42A as shown at 43A. The opposite end 33A of bellows 24A is fixed to the member 20A between its inner and outer ends as shown at 44A.

The opposite ends of the bellows 24A may be fixed in position in a sealed manner using any suitable technique. In this example the opposite ends of bellows 24A are welded to associated members to provide a leakproof joint and a high strength mechanical connection.

With the arrangement of FIG. 3 it will be appreciated that the joint 10A also has its primary seal or metal bellows 24A provided with a secondary seal 25A arranged upstream thereof in a similar manner as in the joint 10. It will also be appreciated that with the joint 10A unguided axial movement is provided and longer service life may be realized by using an externally pressurized bellows.

The joints 10 and 10A, including all component parts thereof, such as the bellows, etc., may be made of any materials suitable for the temperatures and fluids of the applications. Such joints are preferably made of high strength metal alloys containing high percentages of nickel such as metals sold under the trademarks of MONEL and IN-CONEL, for example.

In this disclosure of the invention the annular portions 15 and 15A and annular portions 22 and 22A are shown having particular configurations and defined either as an integral part of their associated members as in the case of portions 22 and 22A or separate portions or members fixed to their associated members as in the case of members 15 and 15A. However, it will be appreciated that the members or portions 15 and 15A may be defined as integral parts of their associated members with the portions 22 and 22A defined as separate members and fixed to their associated members. However, regardless of the detailed construction of members 15, 15A, 22 and 22A, it is important that in the final joint a hooking arrangement be provided so that with increased pressures the cooperating annular portions will be urged more tightly together to provide a secondary fail-safe seal and mechanical connection upstream of the primary seal.

The joints 10 and 10A may be used in fluid systems of all types including those conveying gases and/or liquids.

While present exemplary embodiments of this invention, and methods of practicing the same, have been illustrated and described, it will be recognized that this invention may be otherwise variously embodied and practiced within the scope of the following claims.

What is claimed is:

1. A flexible joint for fluid conduits having a central longitudinal axis and opposed ends and comprising, a first member having a first annular portion fixed thereto which extends at an angle with respect to said axis toward one of said opposed ends, a second member having a second annular portion which extends outwardly thereof away from said axis and toward the other of said opposed ends, and a primary seal in the form of a substantially tubular bellows having an inside diameter; said first member having a small diameter portion defining one end of said joint and an adjoining gradually flaring main body, said first annular portion extending from a large diameter edge of said main body and roughly parallel to a portion thereof, and said second member having a tubular portion which corresponds in diameter to the small diameter portion of said first member with said tubular portion having an outer end which defines the other opposed end of said joint and an inner end terminating in said second annular portion; said primary seal providing a zero leakage connection between said members yet allowing relative movement thereof and having end portions with one end portion fixed to said first annular portion and its opposite end portion fixed to said second member so that said primary seal is arranged concentrically around said tubular portion of said second member; said annular portions defining a secondary seal for said joint and being arranged so that increased fluid pressure in said joint tends to separate said members and urge said annular portions into tighter sealing engagement, said secondary seal arranged upstream of said primary seal to isolate said primary seal from fluid flow induced stresses; said annular portions being hooked together to prevent mechanical disengagement of said members and being arranged concentrically outwardly of said inside diameter to permit greater angular displacements of said members for a given maximum outside diameter envelope for said joint, said annular portions having cooperating load-bearing and sealing surfaces which allow fluid seepage therebetween during normal operation, said fluid serving to lubricate said surfaces and reduce bending loads on said joint, yet being trapped by said primary seal.

2. A joint as set forth in claim 1 in which said primary seal also has resilient properties and yieldingly urges said annular portions into sealed engagement.

3. A joint as set forth in claim 2 in which said primary seal is a metal bellows having opposed end portions with each end portion being fixed in sealed relation to an associated member.

4. A joint as set forth in claim 1 in which said annular portions have cooperating load-bearing and sealing surfaces, and said members have parts which cooperate with said primary seal to completely isolate said surfaces from ambient.

5. A joint as set forth in claim 1 in which said first annular portion comprises a separate member fixed in sealed relation to said first member and said second annular portion comprises an integral part of said second member.

6. A joint as set forth in claim 1 and further comprising a protective cover fixed to said tubular portion and extending concentrically around said primary seal toward said large diameter edge of said main body of said first member having an annular gap therebetween.

7. A joint as set forth in claim 1 in which said primary seal is a metal bellows.

8. A joint as set forth in claim 1 having all of its component parts made of metal.

* * * * *